Feb. 17. 1925.

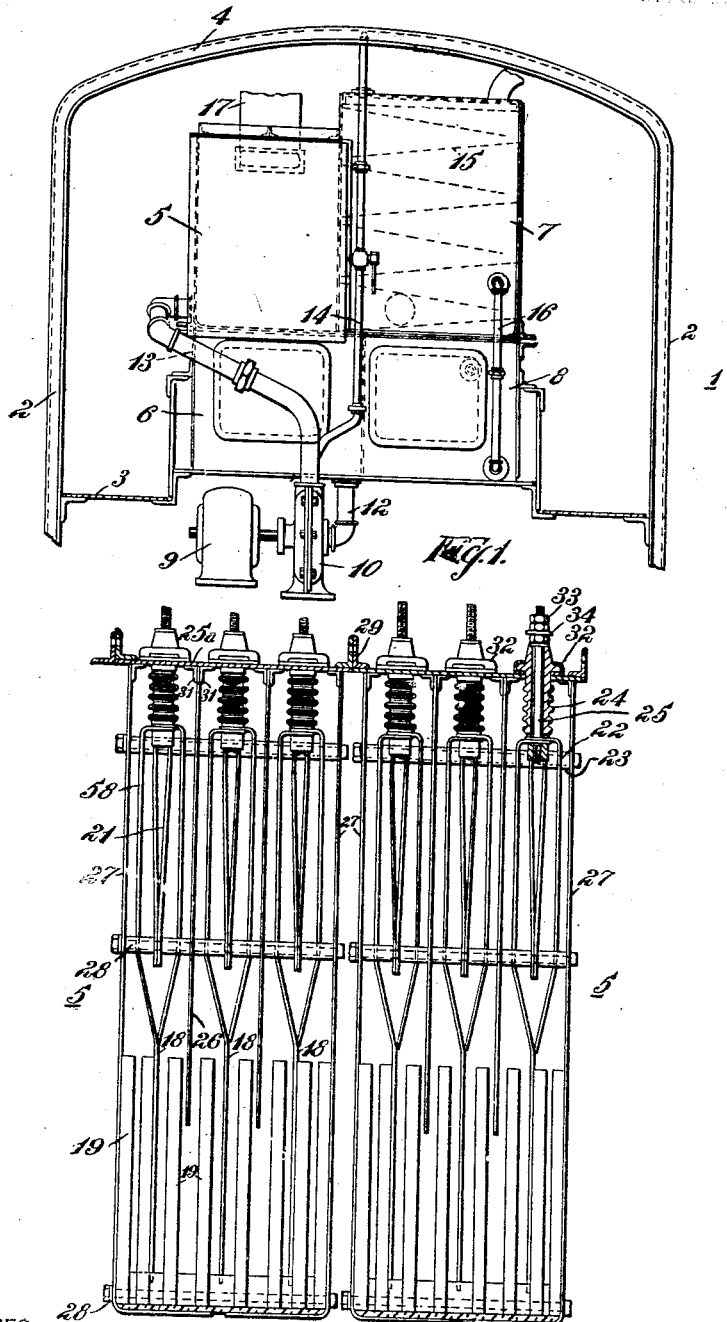

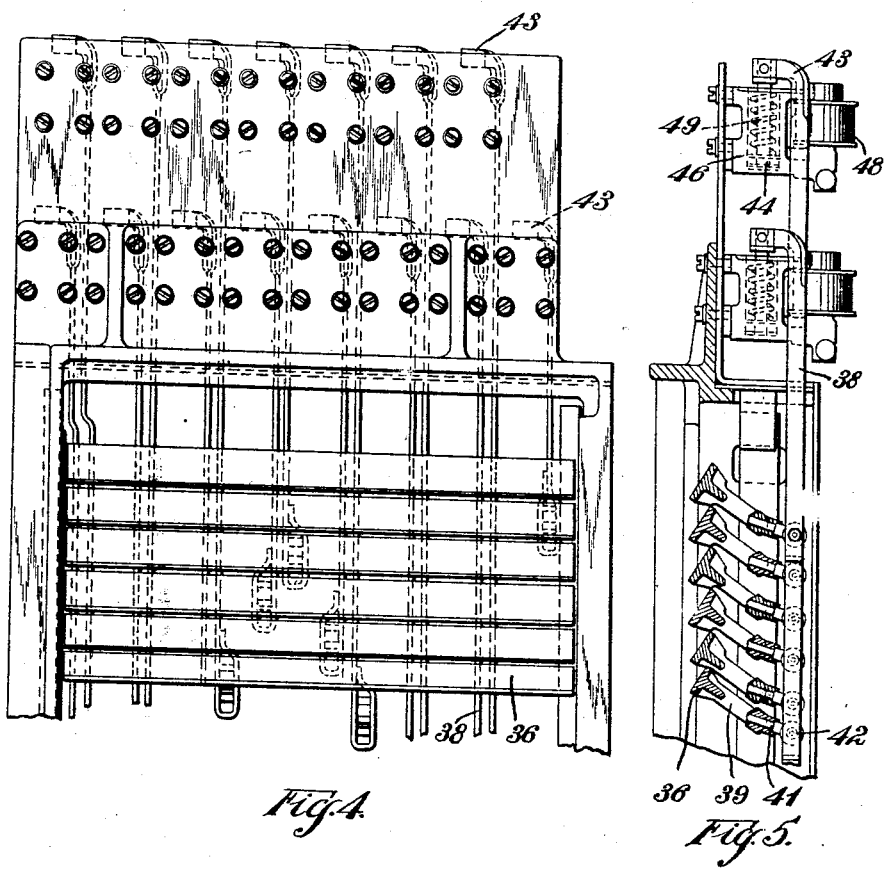

C. C. WHITTAKER

LIQUID RHEOSTAT

Filed Oct. 18, 1920

WITNESSES:

INVENTOR
Charles C. Whittaker
BY
Wesley G. Carr
ATTORNEY

Patented Feb. 17, 1925.

1,526,404

UNITED STATES PATENT OFFICE.

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA.

LIQUID RHEOSTAT.

Application filed October 18, 1920. Serial No. 417,533.

*To all whom it may concern:*

Be it known that I, CHARLES C. WHITTAKER, a citizen of the United States, and a resident of Pittsburgh, in the county of Allegheny and State of Pennsylvania, have invented a new and useful Improvement in Liquid Rheostats, of which the following is a specification.

My invention relates to liquid rheostats and it has particular relation to liquid rheostats employed in motor-control systems that are traversed by relatively large currents, such, for example, as those employed in electric locomotives.

One object of my invention is to provide means for regulating the quantity of electrolyte in a liquid rheostat and for readily discharging electrolyte from the rheostat.

Another object of my invention is to provide improved barriers between the electrodes of a liquid rheostat, whereby the distance traveled by the current in passing from one electrode to another is decreased as the depth of electrolyte surrounding said electrodes is increased.

Another object of my invention is to provide means for preventing loss of electrolyte because of leakage of the rheostat.

Still another object of my invention is to provide an arrangement of electrodes whereby their connection through the electrolyte is gradually changed from delta to star connection upon the gradual increase of the quantity of electrolyte in said rheostat.

A further object of my invention is to provide an improved electrode having relatively greater strength than prior electrodes of substantially the same weight and size and which will effect a more gradual change in resistance upon being immersed in electrolyte.

For a better understanding of my invention, reference should be made to the accompanying drawings—

Figure 1 of which is a view, partly in elevation and partly in section, of a liquid rheostat designed in accordance with my invention and positioned in an electric locomotive.

Fig. 2 is a view, partly in section and partly in elevation, of the rheostat shown in Fig. 1, taken parallel to the side of the rheostat which is shown in Fig. 1.

Figs. 4 and 5 are views, partly in section and partly in elevation, of a weir, comprising a plurality of pivotally mounted shutters, which are a part of the liquid rheostat shown in Fig. 1.

Figure 3:
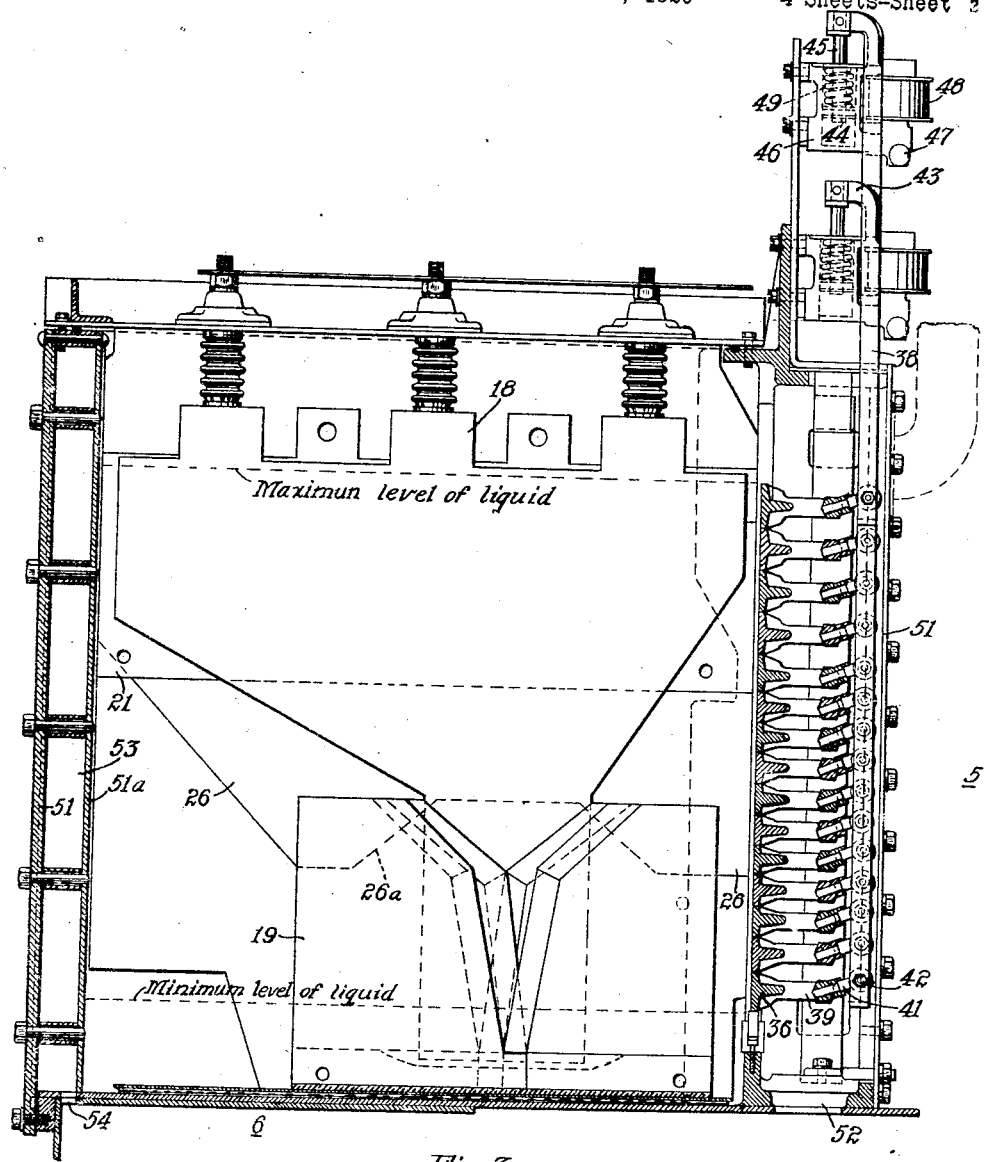
Fig. 3 is a view, partly in elevation and partly in section, of the liquid rheostat shown in Fig. 1, taken perpendicularly to the side of the rheostat which is shown in Fig. 1.
Figure 6:
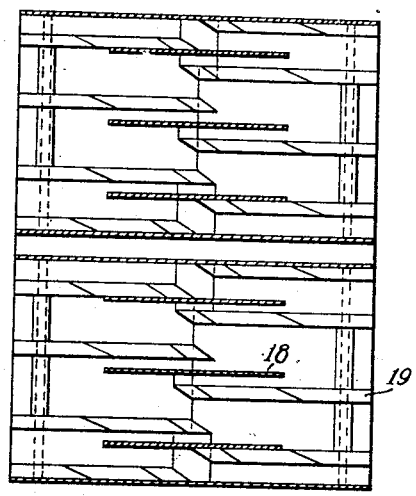
Fig. 6 is a view, partly in plan elevation, and partly in section, of the rheostat shown in Fig. 1.

Referring particularly to Fig. 1, an electric locomotive 1 having sides 2, a floor 3, and a roof 4, has a liquid rheostat 5 mounted therein. The liquid rheostat 5 is superimposed upon an electrolyte tank 6 and is located adjacent to a cooling tower 7, which is superimposed upon a water tank 8.

A motor 9 operates a pump 10 to force electrolyte from a pipe 12, which leads from the electrolyte tank 6, into pipes 13 and 14. The pipe 13 conducts electrolyte from the pump 10 into the liquid rheostat 5. The pipe 14 conducts a portion of the electrolyte from the pump 10 to the cooling tower 7.

The cooling tower 7 comprises a coil 15, which is shown diagrammatically, through which heated electrolyte is circulated.

The pipe 16 conducts water from the water tank 8 into the cooling tower 7, when it becomes necessary to decrease the density of the electrolyte in the reservoir 6. A funnel 17 from the liquid rheostat 5 conducts the vaporized water of the heated electrolyte from the liquid rheostat to the exterior of the locomotive 1.

Referring to Fig. 2, two communicating compartments in side-by-side relation have a plurality of main electrodes 18 mounted therein and severally positioned between soapstone barriers 19. The main electrodes 18 are so constructed that their cross-sections resemble the letter Y, the upper legs of the Y being bent parallel to the lower leg of the Y. Auxiliary electrodes 21 are positioned within the loops formed by the upper legs of the electrodes 18 by means of horizontal bolts 22 and spacing members 23 mounted thereon.

Insulators 24 are provided to insulate bolts 25, by means of which the electrodes 18 are mounted, from the top members 25$^a$ of the liquid rheostat 5. A plurality of electrodes 26 are suitably mounted upon the top member 25$^a$, as later described, and are electrically connected thereby to each other and to end plates 27 of the liquid rheostat 5. The auxiliary electrodes 21 are connected electrically to the end plates 27 by bolts 22.

The top member or cover 25$^a$ is braced by angles 29 to prevent vertical distortion by reason of the weight of electrodes 18, 21 and 26. The ground plates 26 are secured to the top member 25$^a$ by means of the angles 31. An insulating cap 32 is mounted upon each of the bolts 25 and on insulators 24. Nuts 33 and washers 34 are positioned on the bolts 25 to enable a circuit to be connected to electrodes 18.

Referring to Figs. 3, 4 and 5, a plurality of pivotally mounted movable shutters 36 are actuated by vertical arms or rods 38 which are in side-by-side relation with each other. An arm 38 is mechanically connected to the corresponding arm 39 of a shutter 36 by means of an arm 41 and a bolt 42.

Each rod or arm 38 has a bent portion 43 at its upper end. The portion 43 is mechanically connected to a piston 44 by means of a rod 45. The piston 44 is mounted in a cylinder 46 to which air is admitted through an opening 47, which is pneumatically connected with a source of air under pressure. An electromagnet 48 controls an armature member and valve (not shown) which regulates the supply of air that is admitted to the cylinder 46, in accordance with a familiar construction.

A spring 49 normally maintains the piston 44 in its lower position, thereby forcing the arm 38 downward and causing the shutter 36 to assume its open position.

In Fig. 3, the shutters 36 are shown in their closed position, and in Figs. 4 and 5, the shutters 36 are shown in their open position.

In Figs. 4 and 5, the manner of spacing the ends 43 of the rods 38 is shown. For the sake of economy in space, it is necessary that the bent end portion 43 of every other rod 38 be arranged at one level and end portions 43 of the intervening rods 38 be arranged at a higher lever to provide room for the cylinders 46 and armatures 48.

Methods of gradually introducing electrolyte into a rheostat to prevent waves are known to the art and will not be described in detail. This desirable feature is embodied in my rheostat. When the master controller (not shown) is actuated so as to energize one of the electromagnets 48, it will permit air to enter the cylinder 46, thereby raising the piston 44 and the arm 38, causing a shutter 36 to close. This action will cause the electrolyte to rise and shunt a portion of the electrodes 18. Any excess electrolyte will flow over the highest of the closed shutters 36, and will then flow, between the wall formed by the shutters 36 and the outer wall 51, down through an opening 52 into the electrolyte reservoir 6, from whence it will be circulated by the pump 10. The electrolyte is continuously circulating to lower the temperature of that portion of the electrolyte which surrounds the electrodes.

In Fig. 3 is shown the method of preventing loss of electrolyte from the rheostat 5 by reason of leakage. The inner wall 51$^a$ is separated from the outer wall 51 by an air space 53. The inner wall 51$^a$ is made as tight fitting as possible but if there is any leakage the electrolyte drains down through the space 53 and through an opening 54 into the electrolyte reservoir 6.

The shapes and positions of the soapstone barriers 19 which are shown between the electrodes 18 and 26 in Figs. 2 and 3, may be better understood by referring to Figs. 6, 7, 8 and 9. The barriers 19 are cut and positioned to form an opening that somewhat resembles the letter V. However, the barriers 19 are not in contact with one another, as they are placed in staggered relation. As the electrolyte rises in the rheostat, the distance between the legs of the V being greater, the path between the main electrodes 18 becomes more direct.

The sloped portions 55 and 56 of each barrier 19 are so shaped as to form a sharp edge, which prevents eddies of the electrolyte. Each of the ground electrodes has a relatively large notch 26$^a$ which is in substantial alinement with the openings formed by the soapstone barriers 19. The purpose of this notch will be hereinafter described.

Figure 10:
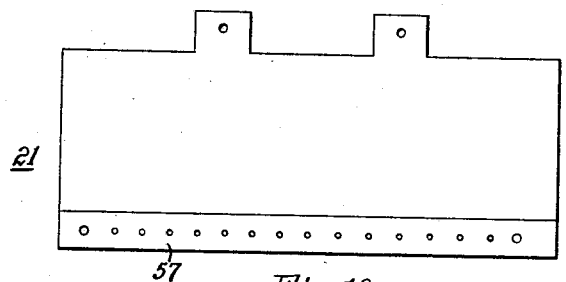
Figs. 10 and 11 are views, in side and end elevations, respectively, of an auxiliary electrode employed in the liquid rheostat shown in Fig. 1.
Figure 11:
Figures 7, 8, 9:
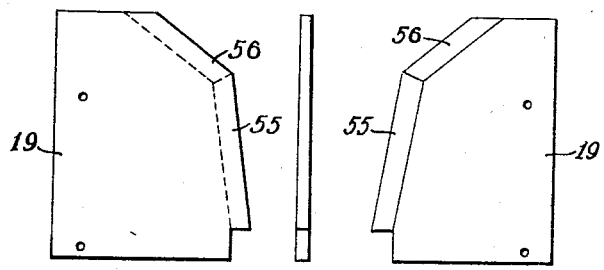
Figs. 7 and 8 are views, in side and end elevation, respectively, of a barrier employed in the liquid rheostat shown in Fig. 1.
Fig. 9 is a view in side elevation of a barrier employed in the liquid rheostat shown in Fig. 1.

In Figs. 10 and 11 an auxiliary electrode 21 comprises two plates which are welded together near their one edge 57, or they may be bolted together as desired. The opposite end of the plates 21 are then bent outwardly to form a cross section resembling the letter V.

Referring again to Fig. 2 and to Fig. 3, it is apparent that when the electrolyte in the tank is below the ground electrodes 26, the main electrodes 18 are electrically connected to each other by a path through the electrolyte and the two outer electrodes 18 are connected to each other by a path through the electrolyte, the end plates 27 and the top member 25ª. The main electrodes 18 are then connected in delta.

Upon the electrolyte rising in the tank until it immerses a portion of the ground electrodes 26, shorter paths are provided between the main electrodes 18 and the ground electrodes 26.

The latter paths form a star connection between the main electrodes 18. Resistance in the circuit is gradually decreased by increasing the depth of electrolyte surrounding the electrodes 18 and 26. However, the delta connection between the main electrodes 18 is maintained but it carries relatively less current by comparison with the star connection.

The purpose of the notch or opening 26ª in the ground plates 26 is to avoid having the ground plates 26 directly in that part of the path between the main electrodes 18, that carries the heaviest current, when the electrodes 18 are connected only in delta. Those portions of the ground electrodes 26 that are surrounded first by the electrolyte are relatively remote from the direct path of current. This path is determined by the soapstone barriers 19, as has already been described.

When the electrolyte rises until it immerses a portion of the auxiliary electrodes 21 an additional path of current is provided to the ground plates 26 and end plates 27.

It is apparent to those skilled in the art that apparatus constructed in accordance with my invention will be relatively simple in construction and reliable in operation, and that a more gradual change of resistance in a circuit may be effected with it than has been done heretofore with liquid rheostats that were employed for similar operations.

While I have shown my invention in a preferred form, it is apparent that minor modifications may be made in the arrangement of apparatus without departing from the spirit thereof. I desire, therefore, to be limited only by the scope of the appended claims.

I claim as my invention:

1. The combination with a liquid container, of means for causing the liquid to enter said container and a weir comprising a plurality of shutters individually operable to control the depth of said liquid in said container.

2. The combination with a liquid container, of means for causing the liquid to enter said container, a plurality of horizontal shutters and means for operating the respective shutters to regulate the depth of said liquid in said container.

3. The combination with a liquid container, having one side normally open, and means for circulating a liquid therethrough, of means for gradually building up said side to increase the liquid level.

4. The combination with a liquid container, having one side normally open, and means for circulating a liquid therethrough, of a plurality of members adapted to be arranged in vertical relation to any predetermined height to fix the liquid level.

5. The combination with an electrolyte container, a plurality of electrodes positioned in said container, means for forcing the electrolyte into said container, a plurality of shutters, and means for operating the respective shutters to vary the depth of liquid in said container.

6. The combination with a liquid rheostat comprising a plurality of vertical barriers movably mounted, means for maintaining said barriers in their open positions, and means for closing said barriers to operate said rheostat.

7. The combination with a liquid-containing tank and a plurality of plates adapted to be positioned in said tank, of a plurality of pivotally mounted barriers, and means for operating the respective barriers to vary the depth of said liquid in said tank.

8. The combination with an electrolyte container, of a plurality of plates positioned in said container, means for forcing electrolyte in said container, a movably mounted barrier for varying the height of said electrolyte in said container, an arm for operating said barrier, resilient means for maintaining said arm in one position, and means comprising an electromagnet for operating said arm to another position.

9. The combination with an electrolyte container, of a plurality of electrodes mounted in said container, a plurality of barriers for varying the height of said electrolyte, said barriers being pivotally mounted and their corresponding surfaces adapted to form a plane upon being actuated to their closed positions, resilient means for maintaining said barriers in their open positions, means comprising a plurality of pistons operated by air pressure for actuating said barriers, a plurality of electromagnets for controlling the air upon said pistons, and means for controlling the energization of said electromagnets.

10. In a liquid rheostat, the combination with a plurality of electrodes, of an insulating barrier between them to increase the distance traversed by current through the liquid between said electrodes, said barrier being so shaped that upon said liquid being increased in depth, a shorter path between said electrodes is provided.

11. In a liquid rheostat, the combination with a plurality of electrodes, of a plurality of insulating barriers between said electrodes, said barriers being so shaped that the distance traversed by current through the liquid between said electrodes decreases as the depth of liquid surrounding said electrodes increases.

12. The combination with an electrolyte-containing tank, and a plurality of electrodes positioned in said tank, of means for varying the depth of said electrolyte in said tank, and a plurality of barriers in staggered relation to each other and so shaped that the winding path of a current between said electrodes is gradually straightened upon a gradual increase in depth of said electrolyte.

13. In a liquid rheostat, the combination with a plurality of electrodes, of means for gradually inserting a different type of electrical connection between said electrodes upon varying the depth of the liquid.

14. In a liquid rheostat, the combination with a plurality of electrodes, of means comprising an electrolyte to gradually shunt the electrodes and to form a different type of connection therebetween.

15. In a liquid rheostat, the combination with a plurality of main electrodes, and an electrolyte for connecting them in delta and for gradually shunting said electrodes, of a plurality of ground electrodes electrically connected to each other and so positioned in relation to said main electrodes that a star connection between said main electrodes through said electrolyte is formed in addition to said delta connection by varying the quantity of electrolyte surrounding said main and ground electrodes.

16. An electrode for a liquid rheostat comprising an integral body of substantially Y-shape.

17. An electrode for a liquid rheostat comprising sheets of material secured relatively close together at one end thereof and separated some distance apart at their other end.

18. In a liquid rheostat, the combination with a tank, of means for circulating the liquid through said tank, a plurality of main electrodes in side-by-side relation in said tank, said electrodes being of substantially Y-shape with two of the legs of each electrode so bent as to be parallel to the third leg thereof, an auxiliary electrode positioned within each of the main electrodes, a plurality of ground electrodes in side-by-side relation to said main electrodes and connected to each other and to said auxiliary electrodes, said main electrodes being connected to each other upon the liquid reaching a certain level in said tank and upon reaching a higher level said main electrodes are also connected to said ground and auxiliary electrodes.

19. In a liquid rheostat, the combination with a plurality of main electrodes, of an additional electrode positioned between said main electrodes, said additional electrodes being so shaped that the portion thereof which first comes in contact with said liquid is relatively remote from the direct path of current between said main electrodes.

20. In a liquid rheostat, the combination with a plurality of main electrodes, of means for confining the current between said main electrodes to a predetermined path, and an additional electrode positioned between said main electrodes, said additional electrode having an opening to prevent that part of the liquid which carries the heaviest portion of the current from being the first to come in contact with the electrode.

21. The combination with a plurality of main electrodes, of a plurality of barriers between said electrodes, said barriers being shaped and positioned to form a groove through which current between said main electrodes must circulate, and an additional electrode having a groove which is in alinement with the groove formed by said barriers.

22. In a liquid rheostat of the polyphase type, the combination with a plurality of electrodes, of means for forming different types of polyphase connections, of said electrodes in accordance with the depth of the liquid.

23. In a liquid rheostat of the three-phase type, the combination with a plurality of electrodes, of means comprising an electrolyte adapted to gradually shunt said electrodes and change the connection thereof from delta to combined delta and star.

24. In a liquid rheostat of the three-phase type, the combination with a plurality of electrodes, of means for forming first a delta and then a star connection of said electrodes in accordance with the depth of the liquid.

25. In a liquid rheostat, the combination with a plurality of electrodes, and an electrolyte for connecting them in delta and for gradually shunting said electrodes, of a second set of electrodes so disposed in relation to the first-named electrodes that a star connection between the two sets of electrodes is also formed upon a predetermined increase in the level of said electrolyte.

26. In a liquid rheostat, the combination with a metal container, and a plurality of main electrodes normally insulated therefrom and from each other, of an auxiliary electrode connected to said container, and of shorter length than said main electrodes.

27. In a liquid rheostat, the combination with a container of conducting material, of a plurality of electrodes arranged in a row and insulated from the container and from each other, and a plurality of additional electrodes connected to said container and respectively located between adjacent pairs of the first named electrodes.

28. In a liquid rheostat, the combination with a container of conducting material, of a plurality of electrodes arranged in a row and insulated from the container and from each other, and a plurality of additional electrodes connected to said container and respectively located between adjacent pairs of the first named electrodes, said additional electrodes being of shorter length than the other electrodes.

In testimony whereof, I have hereunto subscribed my name this 13th day of October, 1920.

CHARLES C. WHITTAKER.